United States Patent
Hillyard

(12) 
(10) Patent No.: US 11,484,467 B1
(45) Date of Patent: Nov. 1, 2022

(54) COMPENSATION RING/LOAD WASHER FOR SPA FITTINGS

(71) Applicant: Waterway Plastics, Oxnard, CA (US)

(72) Inventor: Jason Hillyard, Oxnard, CA (US)

(73) Assignee: Waterway Plastics, Oxnard, CA (US)

( * ) Notice: Subject to any disclaimer, the term of this patent is extended or adjusted under 35 U.S.C. 154(b) by 50 days.

(21) Appl. No.: 17/240,569

(22) Filed: Apr. 26, 2021

(51) Int. Cl.
*A61H 33/00* (2006.01)
*F16L 5/10* (2006.01)
*F16L 5/08* (2006.01)
*F16L 15/02* (2006.01)

(52) U.S. Cl.
CPC ..... *A61H 33/6063* (2013.01); *A61H 33/6005* (2013.01); *F16L 5/08* (2013.01); *F16L 5/10* (2013.01); *F16L 15/02* (2013.01)

(58) Field of Classification Search
CPC .................................................. A61H 33/6063
USPC ...................... 248/125.1, 134.1, 179, 46, 64; 4/695–696, 676
See application file for complete search history.

(56) References Cited

U.S. PATENT DOCUMENTS

| | | | |
|---|---|---|---|
| 3,291,670 A * | 12/1966 | Usab | F16L 41/03 |
| | | | 264/516 |
| 6,094,754 A | 8/2000 | Pinciaro | |
| 6,123,274 A | 9/2000 | Perdreau et al. | |
| 6,322,004 B1 | 11/2001 | Perdreau et al. | |
| 9,549,871 B2 * | 1/2017 | Campbell | A61H 33/0087 |
| 10,378,707 B2 * | 8/2019 | Hillyard | F21S 8/024 |
| 2017/0314240 A1 * | 11/2017 | Culmer | B05B 1/1636 |
| 2018/0023744 A1 * | 1/2018 | Gibb | F16L 43/00 |
| | | | 285/179 |

* cited by examiner

*Primary Examiner* — Lori L Baker
(74) *Attorney, Agent, or Firm* — Sandy Lipkin

(57) ABSTRACT

A sealing method and corresponding compensation ring, or alternately called a load washer, for use in portable spas or bath tubs that can be installed as part of an assembly when attaching fittings that go through a hole in a spa wall. The method and ring are used to compensate for the uneven surface of spa walls and the necessity that the fitting assembly provides that the fitting chosen sits parallel with the inside of the spa wall regardless of the shape of the surface of the wall, whether it is uniform or not. The fitting fits between a nut and the back/plumbing side of the spa wall with the fitting of choice and securing gasket being inserted into the assembly on the front/aesthetic/water side of the spa wall.

20 Claims, 12 Drawing Sheets

COMPENSATION RING/LOAD WASHER FOR SPA FITTINGS

REFERENCE TO PRIOR APPLICATION

This application claims priority of the provisional patent application 63/014,781, filed Apr. 24, 2020 entitled COMPENSATION RING FOR SPA FITTINGS by Jason Hillyard.

BACKGROUND OF THE INVENTION

Field of the Invention

The field of this invention relates generally to the field of spa fittings and installations and more particularly toward a sealing method and corresponding compensation ring, or alternately called a load washer, for use in portable spas or bath tubs.

Description of the Prior Art

U.S. Pat. No. 6,123,274 is an example of a prior art device and method that is common for installing fittings in a spa. Fittings typically employ threads on the outer diameter of an exterior cylindrical body portion with one end of the cylindrical body having a flange feature that has an outer diameter larger than a hole in the spa substrate. The hole in the spa wall is sized to accommodate the cylindrical body portion therein. A gasket or a sealant is used on the back side of the flange to create a seal to the water side of the spa substrate. A nut with threads on an inner diameter bore sized to couple to the threaded cylindrical body is used on the back surface of the spa substrate to fix the fitting to the spa by forcing the flange against the front side of the spa substrate, while also compressing the gasket when employed. A torque setting is commonly used to determine the proper force on the nut required to keep the fitting in place and create the desired compression of the gasket in order to maintain a proper seal between the fitting and the spa wall.

A major problem with this method of installation is that the front side and the back side of the spa substrate need to be parallel in order to keep consistent pressure around the entire flange against the front side of the spa substrate. The common substrates in use inherently vary in thickness. One common form of spa substrate is a vacuum formed plastic, typically acrylic, sheet that is reinforced with a spray on backing material. The backing material is typically resin and fiberglass, but the backing can also be a polymer. The vacuum formed acrylic sheet will have varying thickness and the spray on the backing is also uneven. A secondary step called "back facing" is used when drilling the holes in the substrate. Back facing involves cutting a flat area in the backing material around the hole on the back side of the substrate in an attempt to make the back side of the substrate flat and parallel to the front side of the substrate. The end result is a near parallel surface. The near parallel surface is usually not adequate to achieve the required even pressure on the flange of the fitting. An additional component called a compensation ring or compensation washer is used between the back faced surface of the spa wall and the nut. The contacting faces of the nut and compensation washer have mating spherical profiles that allow the compensation ring to sit flat to the back faced substrate while allowing the nut to slip in the spherical socket to maintain a parallel orientation to the flange in order to allow for even pressure around the flange that then compress evenly against the gasket and or front side of the spa wall. An example of this is found in U.S. Pat. No. 6,322,004. The end result is that the flange, front side of the substrate, and the nut have a parallel orientation along a common longitudinal axis, while the compensation ring and the back side of the substrate contact each other in an orientation to one another that is near parallel to the front side of the substrate within a specified tolerance of angular deflection.

A considerable drawback of back facing is that it is a messy cumbersome process that creates excessive dust that typically requires a special room with an air filtration system that is isolated from the rest of the factory. Workers wear full body protective suits with respirators and goggles. Another obstacle of this prior art method is that the sealing step requires a flat surface on the front side of the spa wall outside of the mounting hole. Furthermore, fiberglass backed acrylic spas have a back face that is a rough, undulating non-planar surface. The face of the compensation ring that contacts the back of the spa wall as taught in the '004 patent has a cored out planar surface that can teeter on the uneven back side of the spa wall that doesn't allow for a consistent, even compression seal formed by the flange of the jet body, gasket and the front of the spa wall.

Loss of compression can occur from a contacting component not having secure, consistent contact with the back surface of the spa. An example of how this loss of compression can occur is through a rocking or teetering of the assembly by way of the back side contacting the component, such as a nut or compensation ring, which occurs when the back side of the spa is uneven and there are only one or two points of contact, so there is no stable plane of contact or when the three points of contact on the contacting component with the back side of the spa wall create a triangular plane wherein the common longitudinal axis does not pierce the area of the triangle or pierces the triangular plane near an edge of the triangular plane, wherein said triangular plane is defined by three points of contact of the contacting component with the spa wall.

This unstable relationship with the common longitudinal axis lying outside of the triangular plane or just inside the edge of the triangular plane created by the three points of contact can cause the furthest point of contact, as measured from the common longitudinal axis, to lift away from the back side of the spa wall by a force applied to one of the components in the spa fitting assembly and can be imagined as a force vector intersecting the longitudinal axis.

The force intersecting the longitudinal axis can be caused by any number of factors. It could be caused by the weight or pulling of connections to the mounted spa fitting, such as plumbing or wiring. The force could be caused by a "water hammer", which is a surge of water through plumbing that may occur upon the starting of a pump connected to the mounted spa fitting through plumbing, the force can be from foam insulation, applied over the mounted spa fitting and its connections, which expands away from the point that it is applied. Any of these examples can bias the spa fitting in a different direction from when the spa fitting was previously mounted.

With the remaining two points of contact allowing for a rocking or teetering effect, a fourth point of contact may be established on an opposing side of the contacting component from the lifted point of contact, wherein an edge of the first triangular plane defined by the line connecting the two remaining points of contact is shared by a new second triangular plane, wherein a new, fourth point of contact becomes the third point of the new second triangular plane of contact. As long as the longitudinal axis does not intersect the shared edge of the first and second triangular planes, a change in compression of the gasket occurs between the two resting positions of the two triangular planes. This change in compression may cause the gasket to no longer seal and thereby allow water to leak.

Another prior art method is disclosed in U.S. Pat. No. 6,0974,754 wherein the method for installing fittings in a spa is disclosed involving a fitting having a smooth exterior cylindrical body portion with one end of the cylindrical body having a flange feature that has an outer diameter larger than a hole in the spa substrate. The hole in the spa wall is sized to accommodate the cylindrical body portion therein. A grommet is used to fix and seal the fitting to the spa. The grommet has an outer diameter sized to fit snuggly within the inner diameter bore of the hole. The grommet has a flange that rests on the front side of the spa substrate and the flange prevents the grommet from falling through the hole. The grommet has an inner diameter that is smaller than the exterior cylindrical body portion of the fitting. From the front side of the spa, the fitting is pressed into the undersized inner diameter of the grommet. The grommet inner diameter is forced outward causing the grommet to be compressed tightly within the inner diameter bore hole, both securing the fitting to the spa and creating a seal between the fitting and the spa wall.

A major problem with this method of installation is that the hole size is critical and has very little tolerance. An oversized or undersized hole could cause the fitting to not be secured properly to the spa and or the fitting to not seal properly. An improperly sized hole could fatigue the fitting and create a failure over time through thermal cycling. Either an undersized or oversized hole is not easy to repair and could result in a repair that is not economically practical. The small tolerance of the hole can require custom hole saws with non-standard dimensions that require frequent inspection and repair or replacement.

Another problem is that installation of the fitting within the grommet typically requires hitting the fitting with a mallet to force the fitting into the grommet. The fitting could be damaged during installation. Additionally, expensive lubricants are commonly used to ease the installation of the fitting into the grommet, but the use of lubricants interject additional concerns. If the lubricant does not dry effectively, the fitting may not stay positioned properly, resulting in a defective installation requiring repair. Another problem with lubricants is that they need to be compatible with any material that they may come in contact. If an incompatible lubricant is used, the material of an incompatible component could degrade and fail.

There is also a concern with the invention disclosed in U.S. Pat. No. 6,0974,754 with chipped acrylic, which can commonly occur when cutting holes in the spa wall. In a typical gasket installation, the sealing surface of the gasket is on the front side of the spa wall against the water tight acrylic surface and the contact surface between the gasket and the spa wall is usually large enough to allow for sealing around the boundary of the hole and chipped surface of the acrylic that may be just outside of the hole in the spa wall. With this method of sealing disclosed in U.S. Pat. No. 6,0974,754, most any chip in the acrylic that would have been covered by the seal of a gasket, is much more likely to cause water leaks between the grommet of the invention and the inner circumferential surface of the hole, since the backing material is intended for supporting the acrylic and not for being water tight. Also, leaks may not immediately detectable as the water may wick through the backing material and allow the water to drain out from the spa in a remote location away from the source of the leak, making it difficult to detect or diagnose the source of the leak. These leaks may slowly cause the acrylic surface to delaminate from the backing material, which may allow for the acrylic to crack.

It is the primary object of the instant invention to provide an improved, specialized compensation ring that has a conical contact surface on the front side of the compensation ring that will contact the back side of the spa wall at the corner of the hole allowing the conical profile to fit partially within the hole in the spa wall creating a stable parallel or near parallel surface to the front of the spa wall on the back side of the compensation ring to allow the nut to tighten a spa fitting stably without rocking the assembly and with even compression to seal the gasket against the backside of the flange of the wall fitting and the front side of the spa wall along the common longitudinal axis between the fitting and the spa wall.

It is another object of the instant invention to provide an improved method for installing fittings into a spa wall using said improved, specialized compensation ring with conical contact surface that creates a non-teetering contact using the concentricity of the hole to contact with the spa wall.

It is yet another object of the instant invention to provide a compensation ring with a low profile thereby allowing the nut to have thread engagement with thicker walls than the prior art can achieve.

It is yet another object of the instant invention to provide a compensation ring designed to prevent the compensation ring from cracking and or breaking from hoop stress and prevent the issues associated with loss of compression caused by the compensation ring increasing in diameter from lack of hoop strength and rigidity to maintain the mating parallel contact plane and continued compression of the gasket of the assembly than the prior art by having the conical profile of the compensation ring supported by the spa wall partially within the hole.

It is yet another object of the instant invention to provide a method of installation that has no requirement for sealant, such as silicone sealant.

It is yet another object of the instant invention to provide a method of installation that will improve the stability of the assembly for use without a gasket and using a sealant, such as silicone sealant.

It is yet another object of the instant invention to provide a method of installation that has no requirement for expensive lubricants.

It is yet another object of the instant invention to provide a method of installation that has no requirement for special hole saws.

It is yet another object of the instant invention to provide a method of installation that has no requirement for hammering or special tools for installation.

It is yet another object of the instant invention to provide a method of installation that has wide tolerances in the hole saw size.

It is yet another object of the instant invention to provide a method of installation that is easy to install.

It is yet another object of the instant invention to provide a method of installation that has no requirement for back facing of the spa backing material.

SUMMARY OF THE INVENTION

The basic embodiment of the present invention teaches a assembly for improved sealing of fittings to spa walls comprising: a spa wall with a back/plumbing side and a front/water side; a hole in said spa wall for the placement therethrough of a fitting, said fitting having a flange and threads around a cylindrical body of said fitting that fits through said hole and said flange; a sealing agent to be placed between said front/water side of said spa wall and said flange of said fitting that is larger in diameter than said hole; a compensation ring/load washer, said compensation ring having a top side and a bottom side and a center aperture, said center aperture having an outer perimeter boundary of the compensation ring/load washer opposite the inner aperture boundary and having a conical profile; and a nut to secure said compensation ring/load washer around said fitting and to the back side of said spa wall wherein said conical profile fits partially into said spa wall hole thereby creating a stable, near parallel surface to said front/water side of said spa wall wherein a center axis runs through said fitting through to said nut in a direction perpendicular to the front side of said spa wall.

The above embodiment can be further modified by defining that said sealing agent is a gasket The above embodiment can be further modified by defining that said sealing agent is a sealant.

The above embodiment can be further modified by defining that said compensation ring/load washer includes one or more tabs extending outwardly from said central axis beyond an outer diameter of said nut.

The above embodiment can be further modified by defining that said gasket includes an L-portion to center said fitting inside of said hole when said hole is sized to allow the smaller end of the frustoconical surface of the load washer that is larger than the major diameter of the threads of the fitting to enter into the hole in the spa wall from the back side of the spa wall.

The above embodiment can be further modified by defining that said compensation ring/load washer has an inner diameter that is greater than said threads on said fitting.

The above embodiment can be further modified by defining that said spa walls are thicker than a standard spa wherein said nut further comprises threads that are positioned forward of the back side of said compensation ring/load washer and a cylindrical body with said threads within its inner diameter and adjacent a front side of said nut for coupling with adjacent threads on said fitting and wherein a back side of said cylindrical body of said nut has a flange extending outward from said central axis.

The above embodiment can be further modified by defining that said nut includes a flange with gripping portions for easier tightening in the case of larger spa walls wherein said gripping portions have a shape that can be taken from the following group: rectangle, pentagon, hexagon, heptagon, octagon, gear shape, lever, series of levers, multiple recessed pockets, protrusions, ribs.

The above embodiment can be further modified by defining that said fitting has a need for air bypass openings and said air bypass openings are incorporated into said nut.

The above embodiment can be further modified by defining that said air bypass openings are fitted within said hole in said spa wall.

The above embodiment can be further modified by defining that said fitting has a need for air bypass openings and said air bypass openings are incorporated into said load washer.

The above embodiment can be further modified by defining that said fitting is customized with a step below the flange to center said fitting inside of said hole when said hole is sized to allow the smaller end of the frustoconical surface of the load washer that is larger than the major diameter of the threads of the fitting to enter into the hole in the spa wall from the back side of the spa wall.

The above embodiment can be further modified by defining that installation of the assembly onto the spa has no requirement for back facing of the spa backing material.

An alternate embodiment of the instant invention provides for an assembly for improved sealing of fittings to spa walls comprising: a fitting, said fitting having a flange and threads around a cylindrical body of said fitting; a sealing agent to be placed between said flange of said fitting and a front side of a spa wall for use when installed into said spa wall; a compensation ring/load washer, said compensation ring having a top side and a bottom side and a center aperture, said center aperture having an outer perimeter boundary of the compensation ring/load washer opposite the inner aperture boundary and having a conical profile; and a nut for use to secure said compensation ring/load washer around said fitting and to said spa wall wherein said conical profile fits partially into a hole in said spa wall thereby creating a stable, near parallel surface of said fitting flange to said spa wall.

The above embodiment can be further modified by defining that said sealing agent is a gasket.

The above embodiment can be further modified by defining that said sealing agent is a sealant.

The above embodiment can be further modified by defining that said compensation ring/load washer includes one or more tabs extending outwardly from said nut.

The above embodiment can be further modified by defining that said gasket includes an L-portion to center said fitting inside of said hole when said hole is sized to allow the smaller end of the frustoconical surface of the load washer that is larger than the major diameter of the threads of the fitting to enter into said hole.

The above embodiment can be further modified by defining that said compensation ring/load washer has an inner diameter that is greater than said threads on said fitting.

The above embodiment can be further modified by defining that said fitting is customized with a step below said flange for use with centering said fitting inside of said hole when said hole is sized for use with allowing the smaller end of the frustoconical surface of the load washer that is larger than the major diameter of said threads of said fitting to enter into said hole in said spa wall from the back side of said spa wall.

The above embodiment can be further modified by defining that installation of the assembly onto the spa has no requirement for back facing of the spa backing material.

The above embodiment can be further modified by defining that the nut further comprises threads that are configured for being positioned forward of the back side of said compensation ring/load washer and a cylindrical body with said threads within its inner diameter and adjacent a front side of said nut for coupling with adjacent threads on said fitting and wherein a back side of said cylindrical body of said nut has a flange extending outward from said central axis.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
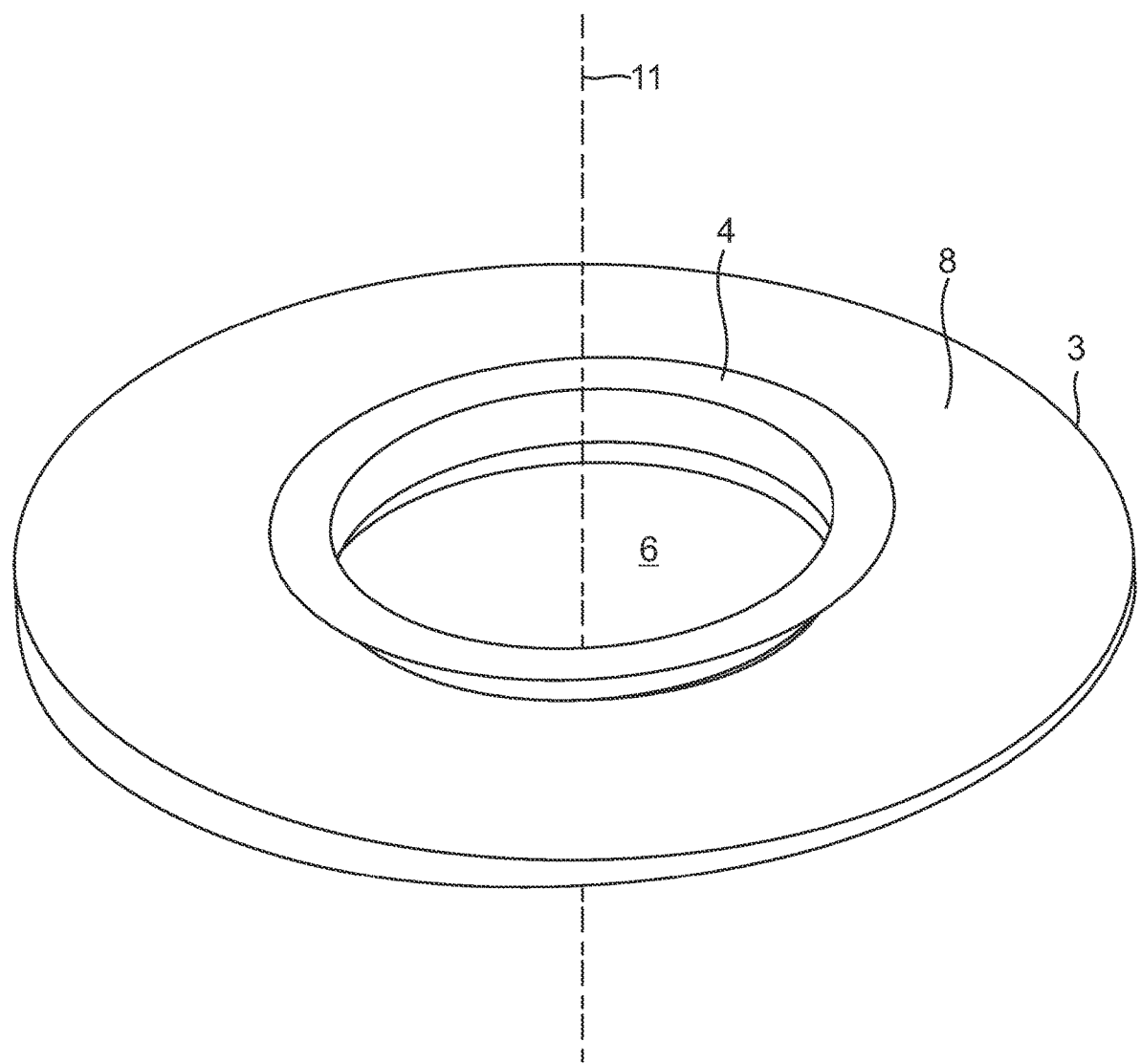
FIG. 1 is a top planar view of the compensation ring/load washer of the instant invention in isolation from a spa fitting and gasket, but placed inside of a hole in a spa wall.

Turning to the drawings, the preferred embodiment is illustrated and described by reference characters that denote similar elements throughout the several views of the instant invention.

Figure 2:
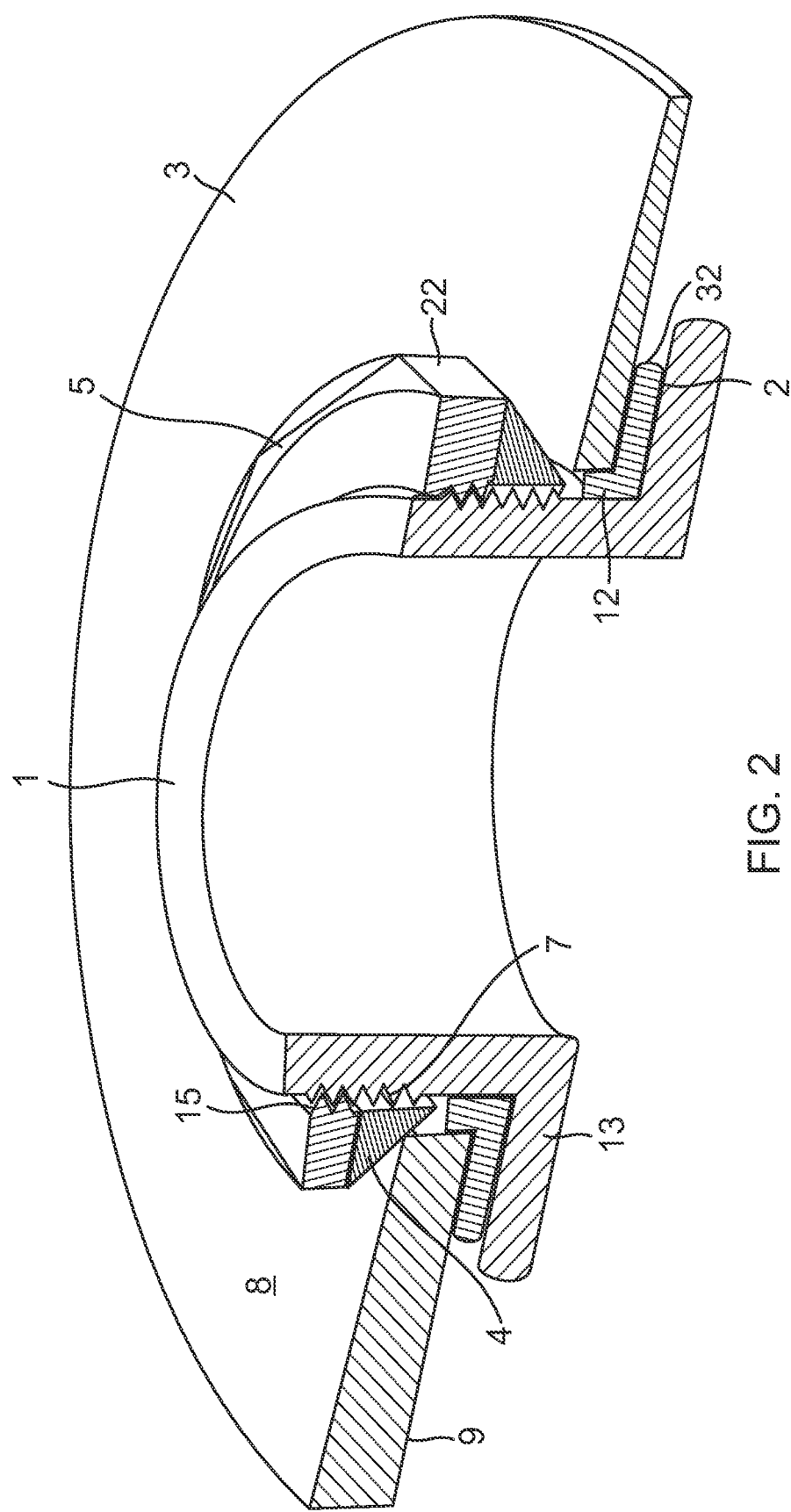
FIG. 2 is the same as FIG. 1, but with the ring cut in half with a spa fitting shown in phantom.

The preferred embodiment of the instant invention provides for an assembly and method of use therefor for installing all sorts of fittings, jets, filters, topside controls, valves, lights, suctions and air controls in a bored hole in a spa wall, which includes a specialized compensation ring also called a load washer 4. Throughout this disclosure this compensation ring will alternately be referred to as such, and sometimes as a load washer 4, which, as described herein, is designed for use in affixing spa fittings 1 into a spa wall 3. FIG. 1 shows the load washer 4 as it is fitted into a hole 6 in a spa wall 3. FIG. 2 takes the view of FIG. 1 and slices it in half and places an illustrative fitting 1 therein to show how a fitting 1 fits therethrough. The conical profile of the compensation ring 4 is clearly seen in this view. As shown in FIG. 2, the spa wall 3 has a back side 8 where the plumbing is and a front side 9 where the water is. The fitting of choice 1 is fitted through the hole 6 from the front side 9 through to the back side 8 after passing through the load washer/compensation ring 4 and secured thereto with a nut 5. On the front side 9 of the spa wall 3 is sealing agent 32 in the form of a gasket 2 that helps seal the fitting 1 in place. Once fitted therethrough, the compensation ring 4 with its conical profile can fit partially in the hole 6 in the spa wall 3 thereby creating a stable, near parallel surface to the front 9 of the spa wall 3 on the back side of the compensation ring 4 that allows a nut 5 to tighten the fitting 1 thereon without rocking the entire assembly and with even compression to seal the gasket 2 against the back side of a flange 13 on the fitting 1 and the front side 9 of the spa wall 3. The L-portion 12 of the gasket 2 helps to keep the fitting 1 centered within the hole 6.

Figure 3:
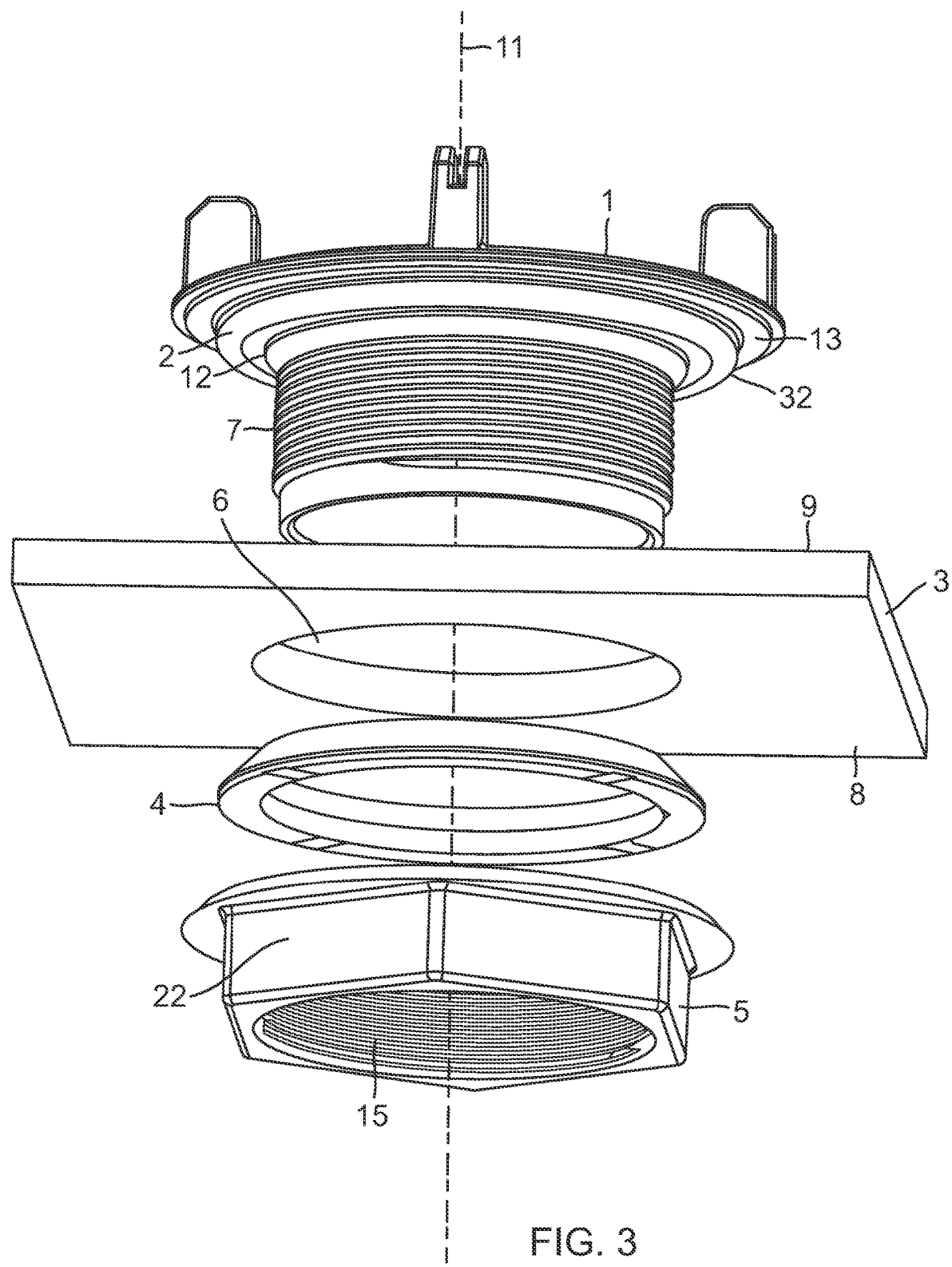
FIG. 3 is an exploded view of the compensation ring/load washer shown in use as a system of mounting spa fittings to a spa wall showing the various components therein in an exploded view.
Figure 3A:
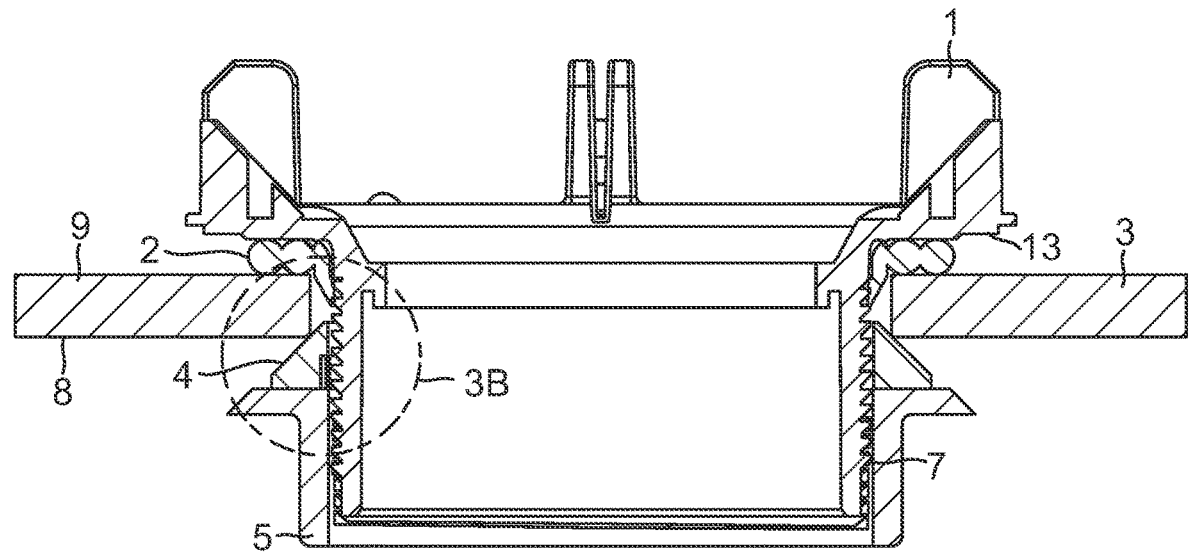
FIG. 3A is a side cross sectional view of the system shown in FIG. 3 fully assembled.
Figure 3B:
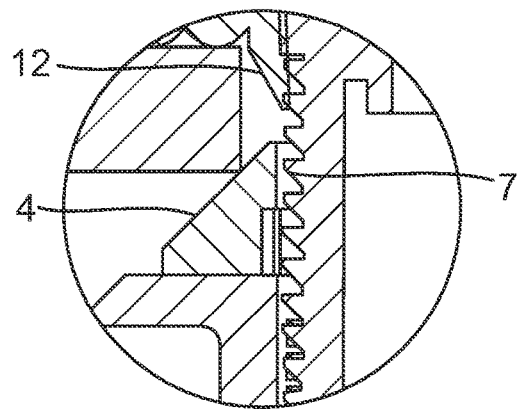
FIG. 3B is a close-up view of the area marked 3B-3B in FIG. 3A.
Figure 4:
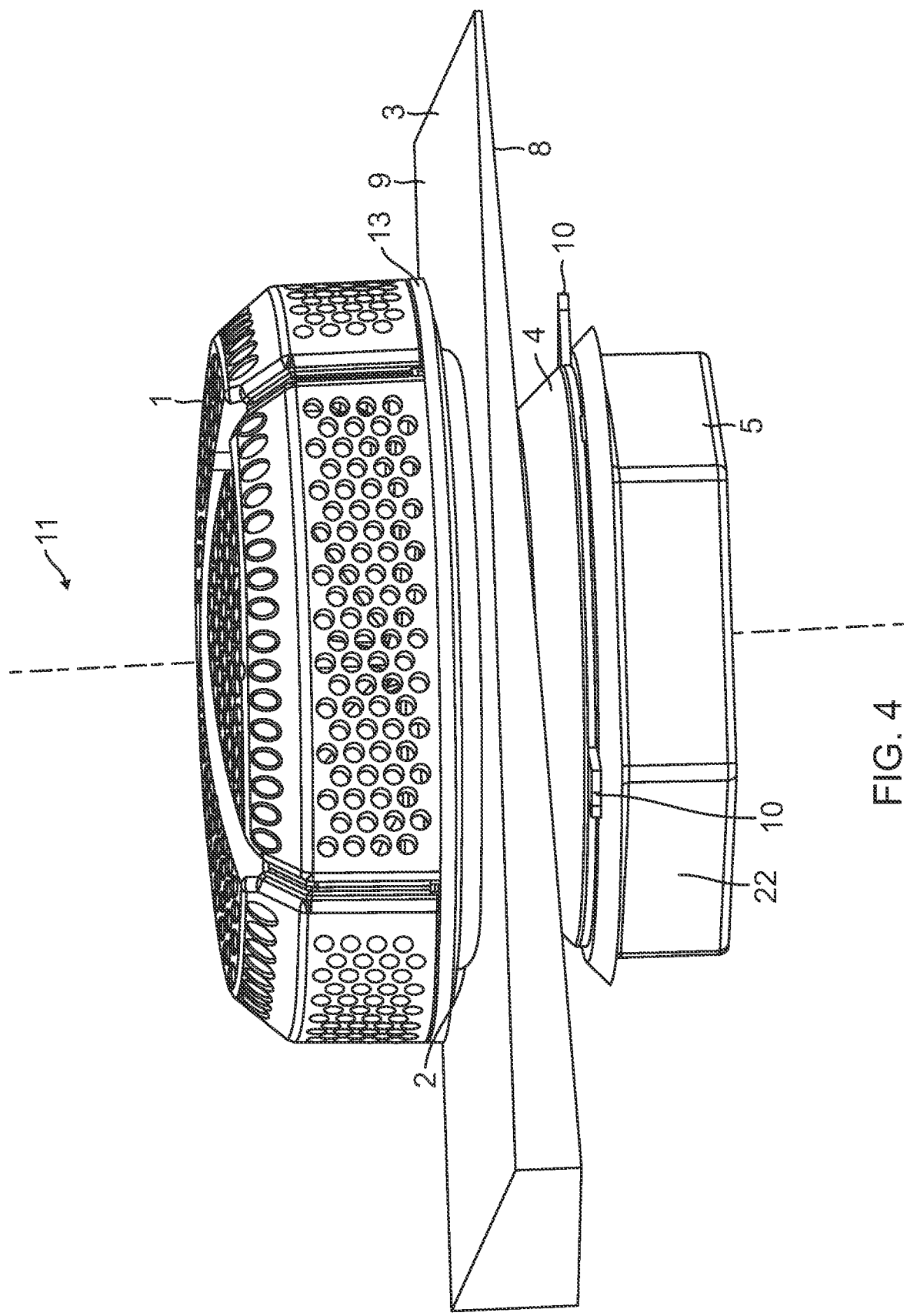
FIG. 4 is a side view of the system shown in FIG. 3 fully assembled with an illustrative spa fitting that is different than that shown in FIG. 3.
Figure 5:
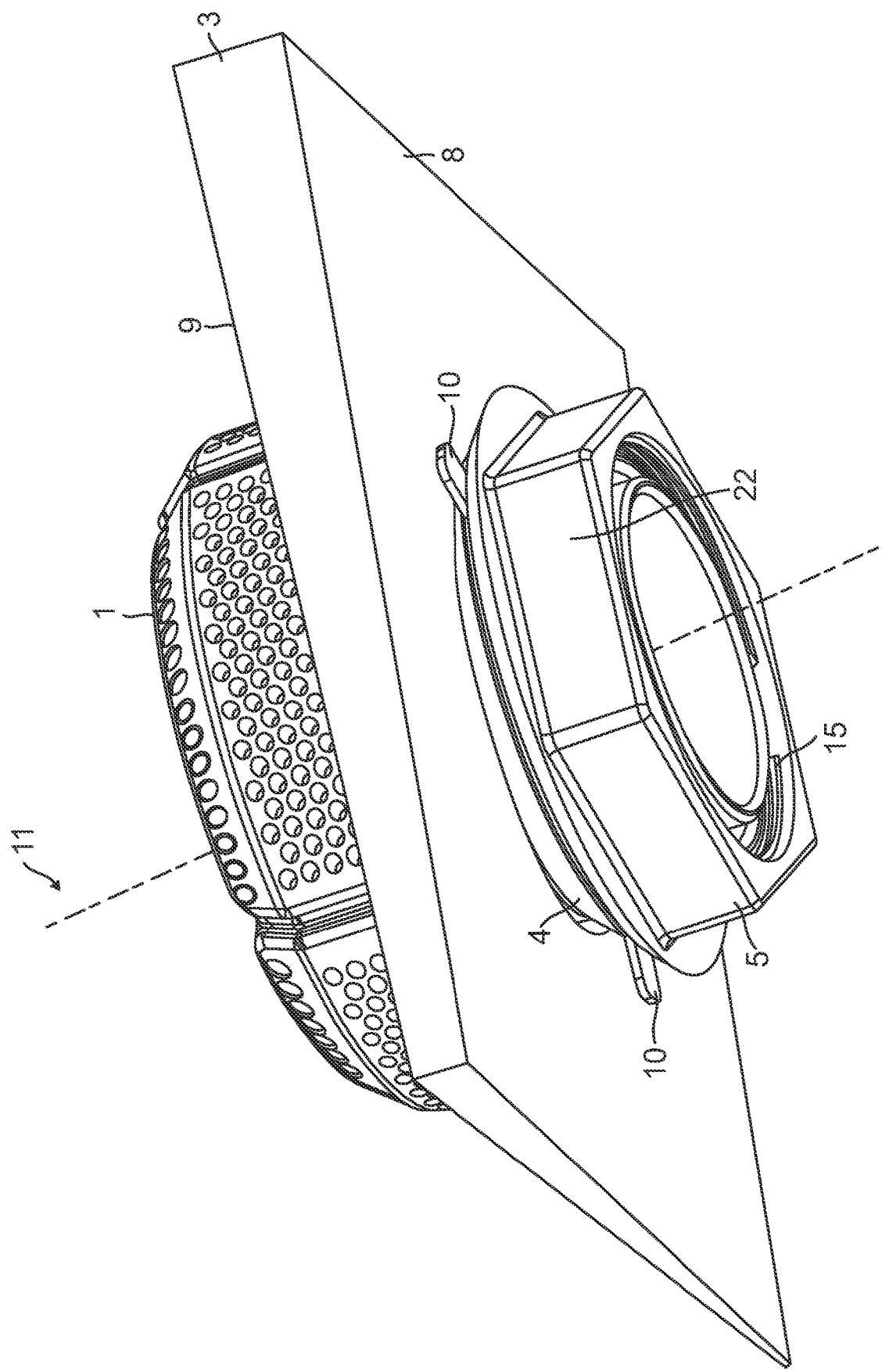
FIG. 5 is a bottom perspective view of the assembly shown in FIG. 4.

FIG. 3 shows the entire system in an exploded view starting from the top with the fitting 1 with the gasket 5 secured thereto to then be placed through the hole 6 in the spa wall 3 followed by the load washer/compensation ring 4 and the securing nut 5. FIG. 3A shows the system fully assembled in side cross-section view and FIG. 3B shows the close-up section as marked in FIG. 3A. Side view and bottom perspective views are shown in FIGS. 4-5 with a different spa fitting 1 and not in cross section. In FIGS. 4-5 the tabs 10 on the compensation ring 4 are visible.

These tabs 10 at the outer diameter of the load washer 4 serve as an indication that the load washer 4 is installed. The load washer 4 gets hidden by the nut 5 once installed, so the tabs 10 on the load washer 4 extend beyond the outer boundary from the central axis 11 of the nut 5 as a quality control check that the load washer 4 has been installed on the assembly.

Figure 6:
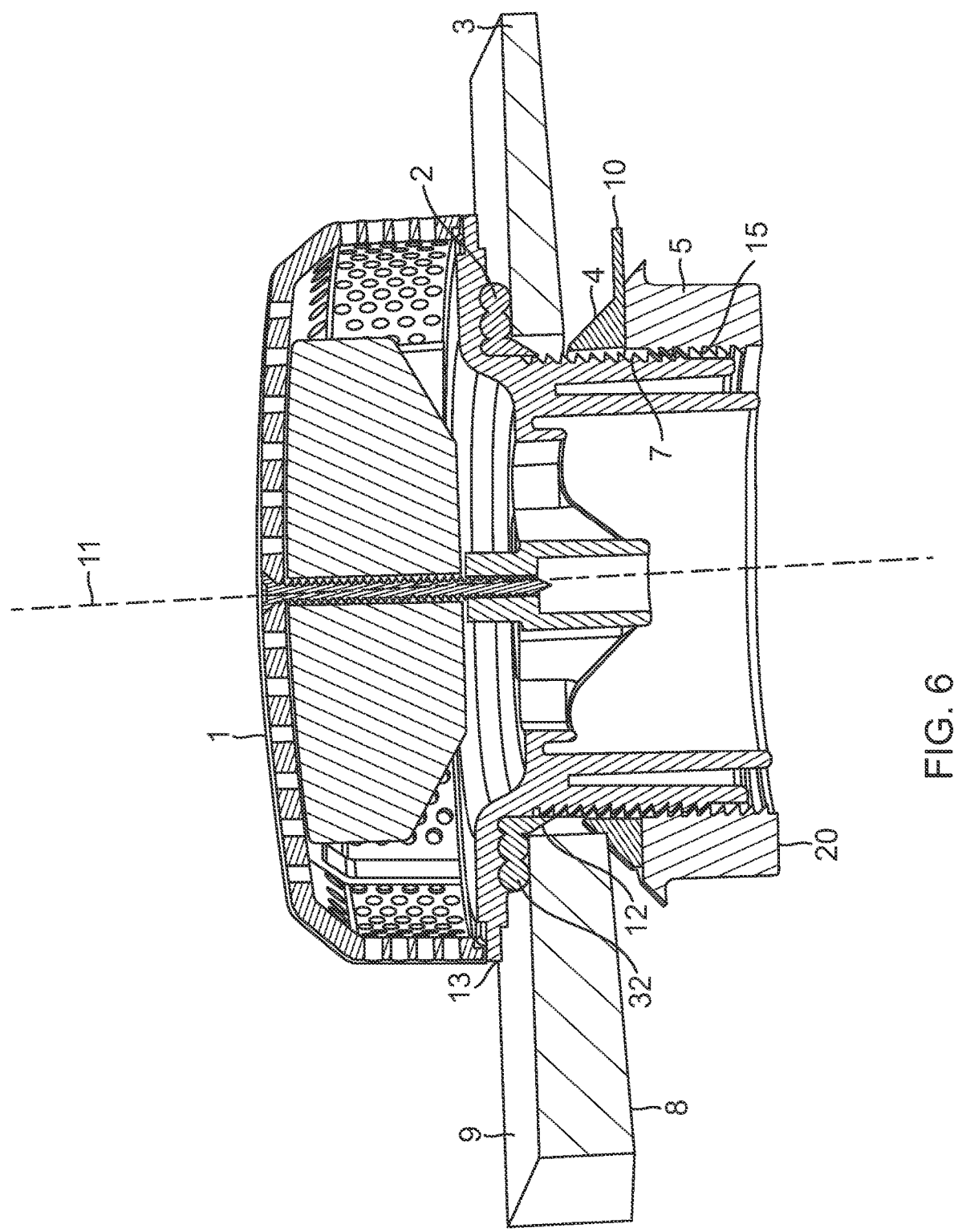
FIG. 6 is a side cross-sectional view of the assembly shown in FIG. 4.
Figure 7:
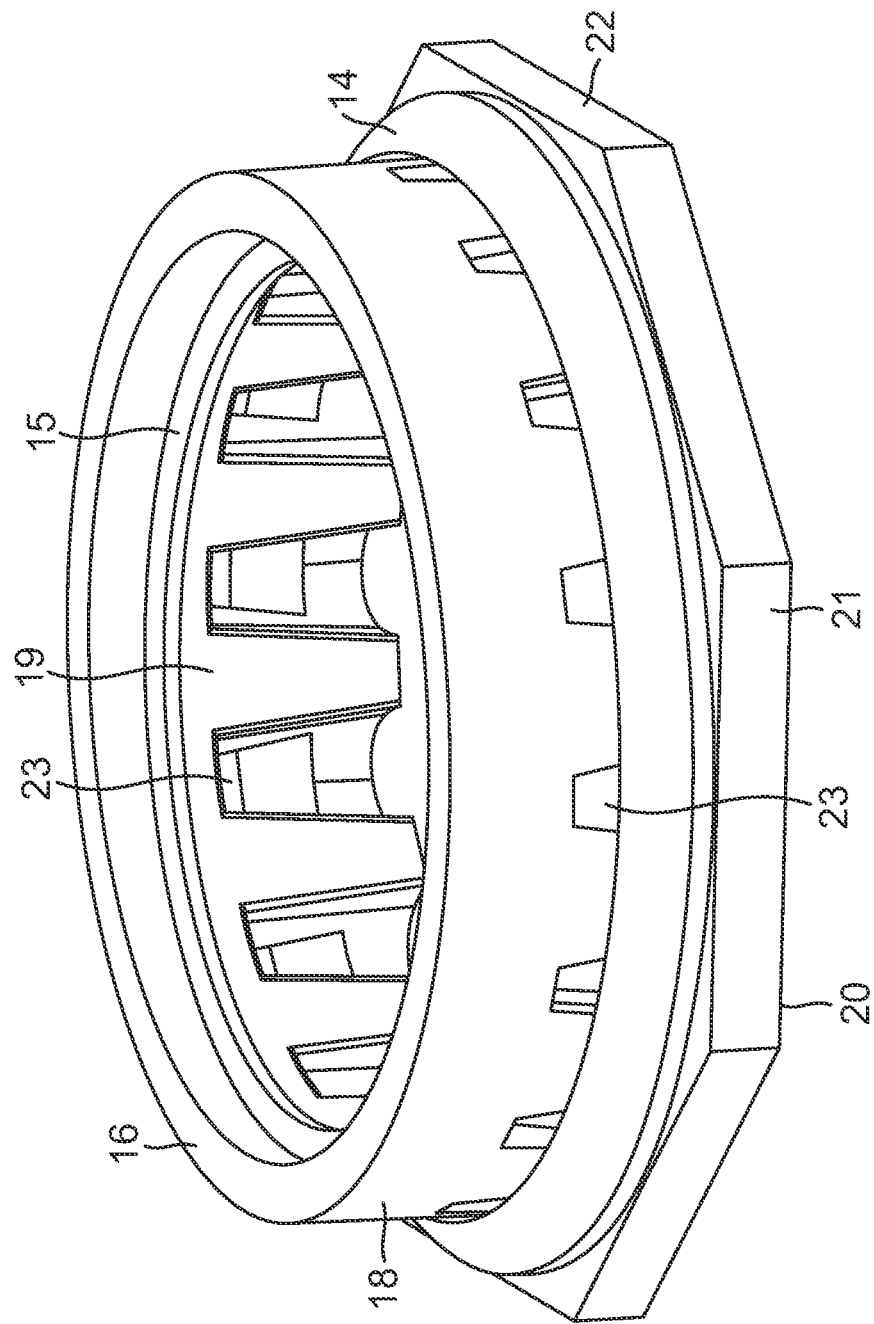
FIG. 7 is a top side perspective view of an alternate embodiment of the compensation ring/load washer of the instant invention for use in spa walls that are thicker than those for which the preferred embodiment is used.

FIG. 6 is a side cross-sectional view of the assembly shown in FIGS. 4-5. In this figure, the L-portion 12 of the gasket 2 type of sealing agent 32 is pointed out as a centering feature of the assembly when there is an oversized hole. When there is an oversized hole, the fitting 1 should be centered on the front side 9 of the wall 3 and use the L-portion 12 or custom fitting 1 with a step below the flange 13 on the fitting (step not shown).

The load washer 4 should have an inner diameter larger than the diameter of the threads 7 in the fitting 1. The spa wall hole 6 should have a central axis 11 that is perpendicular to the flat front face 9 of the spa wall 3 surrounding said hole 6. This helps with proper positioning of the load washer 4 and therefore results in a more even compression of the sealing gasket 2.

A specialized hole cutting apparatus (not shown) that is designed to orient a hole cutting tool (not shown) perpendicular to the front face 9 of the spa wall 3 would be beneficial to ensure that the hole 6 is cut so that the central axis 11 of the spa wall hole 6 is perpendicular to the front side 9 of the spa wall 3. This could be a spring loaded U-shaped or ring-shaped guide (not shown) that contacts the flat front face 9 of the spa wall 3 at the location where the gasket 2 seal will be located immediately outside of where the spa wall hole 6 is to be cut and has a perpendicularly extending telescoping arm (not shown) located parallel to the central axis 11 of the hole saw (not shown) and movably attached to a drill motor (not shown) wherein the U surrounds the hole saw as the drill motor is moved forward to first allow the U feature to contact the front side 9 of the spa shell wall 3, and, secondly, the movable attached arm is collapsed opposing the force of the spring toward the drill motor to allow the hole saw pilot to contact the front side 9 of the spa wall 3 and drill through said wall 3 allowing the cutting teeth of the hole saw to contact the front side 9 of the spa wall 3 and cut the hole 6 in the spa wall 3, all the time being guided and the central axis of the hole saw oriented perpendicular to the front side 9 of the spa wall 3 by the U or ring shaped guide as the spring loaded arm is continually collapsed toward the drill motor.

An alternate embodiment of the compensation ring/load washer 14 is shown and illustrated in FIGS. 7-9B. This alternate embodiment allows for installation on thicker walls 17. (See FIGS. 9A 9B.) In this embodiment, the threads 15 of the specialized nut 16 are positioned forward of the nut flange 21. The thicker walls 17 tend to be more of an issue at the top of the spa where the topside controls are placed, though thick areas may be found in any location of the spa.

The nut 16 of this load washer 14 assembly is configured with a generally cylindrical body having threads 15 located within the inner diameter 19 and adjacent the front side of the nut 16 for a coupling engagement with threads 7 of a fitting 1. The back side 20 of the cylindrical body 18 of the nut 16 has a flange portion 21 extending outward from the central axis 11 of said nut 16. The specialized nut 16 may alternately be described as having the threads 15 located forward of the flange portion 21 of the nut 16. It should be understood that various versions of the invention may benefit by variations in the distance of the threads 15 on the nut 16 in relation to the front side of the nut flange 21 in the direction of the central axis 11, as a greater distance there is between the threads 15 and flange 21, the thicker the spa wall 3 can be without requiring a specialized fitting 1 that is lengthened in the direction of the central axis 11 away from the fitting flange 13 and said specialized fitting having the threads 7 also extended further back on the fitting 7. Is should be recognized that the nut 16 would be a more practical and cost-effective solution than to create a specialized lengthened fitting and using the nut 5 from the previously described embodiment.

When the load washer 14 assembly is assembled, the threads 15 of said nut 14 are positioned closer to the front side 9 of the spa wall 17 than the back side of the load washer 14. The load washer 14 is supported by the flange 21 feature of said nut 16 wherein the outer diameter 20 of the cylindrical body 18 portion of the nut 16 is located within the inner diameter opening of the load washer 14 as well as being partially located within the inner diameter opening of the spa wall hole 6.

The flange 21 portion of the nut 16 may be configured with features for engagement to assist with imparting greater rotational force or torque to said nut 16. The features may be a polygon shape grip feature 22, such as an octagon, a gear shape, a lever or series of lever shapes, or other shape where the shape is located at the outer boundary of the flange 21 as viewed in line with the central axis 11 of the nut 16. The features may also or alternately include multiple recessed pockets, protrusions, or ribs on the backside of the nut 16, or other feature to allow for or assist with the rotational coupling of the nut 16 to the assembly by hand or with a tool. The greater rotational force or torque is to aid in the securing of the assembly as well as allowing for a desired compression of a gasket 2 between a flange 13 of said fitting 1 and the front side 9 of the wall 3, 17. More broadly, the greater rotational force or torque is to aid in the securing of the assembly as well as allowing for the retention of sealing agent 32 between a flange 13 of said fitting 1 and the front side 9 of the wall 3, 17.

An air control version of this washer/nut 16, 21 assembly has air bypass openings 23. If the assembly is installed on a certain thickness of spa wall 17, the air intake of the air control body 26 may be located within the hole 6 of the spa wall 17. If the air intake of the air control body 26 is above the threads 15 of the nut 16, then the air may need to bypass the threads 15 through bypass openings 23. This is especially the case if the compensation ring 14 contacting 360 degrees around the spa wall 17.

Figure 8:
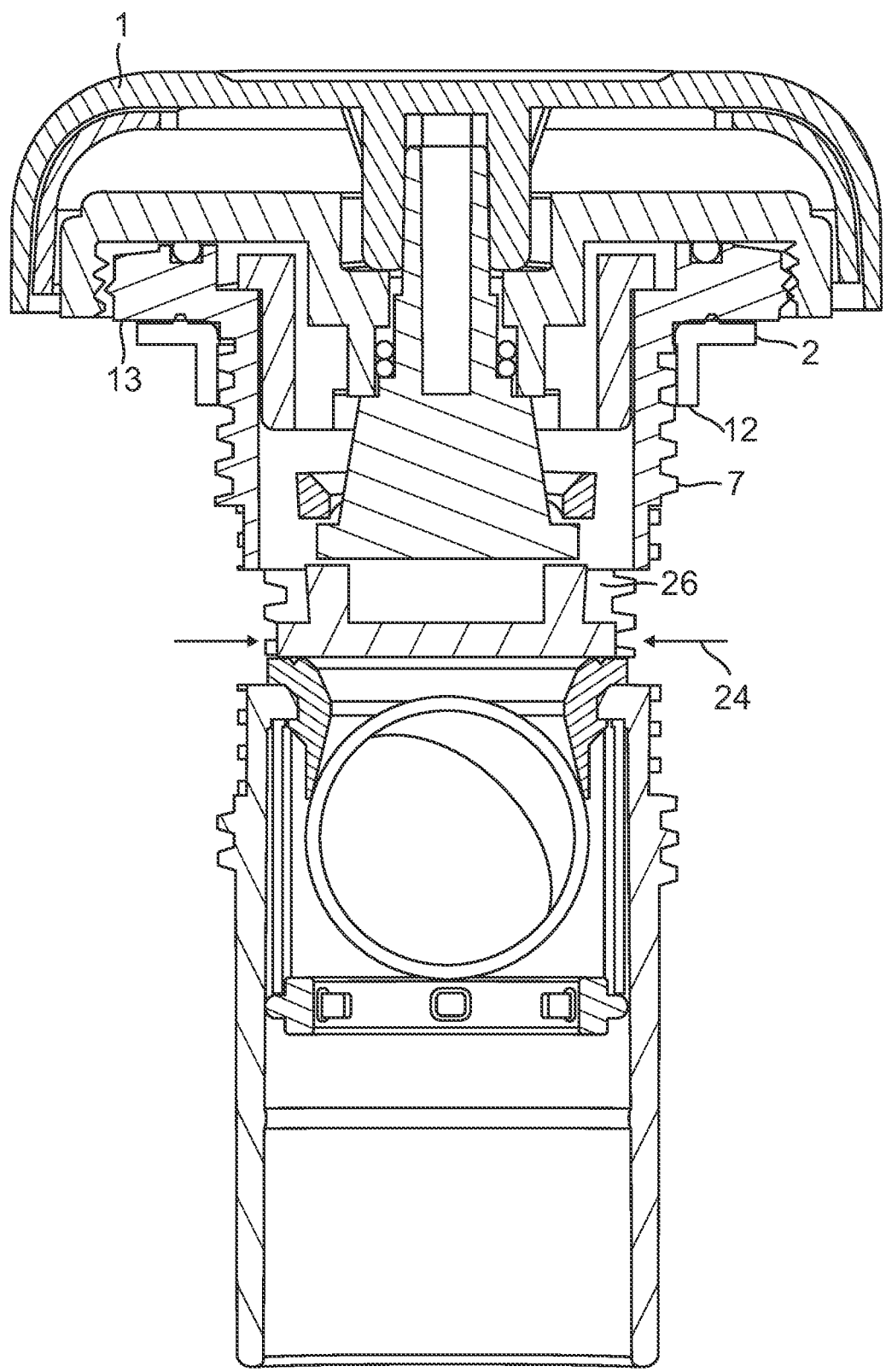
FIG. 8 is a side cross sectional view of spa fitting using the compensation ring/load washer of the alternate embodiment shown in FIG. 7 without showing the spa wall.
Figure 9A:
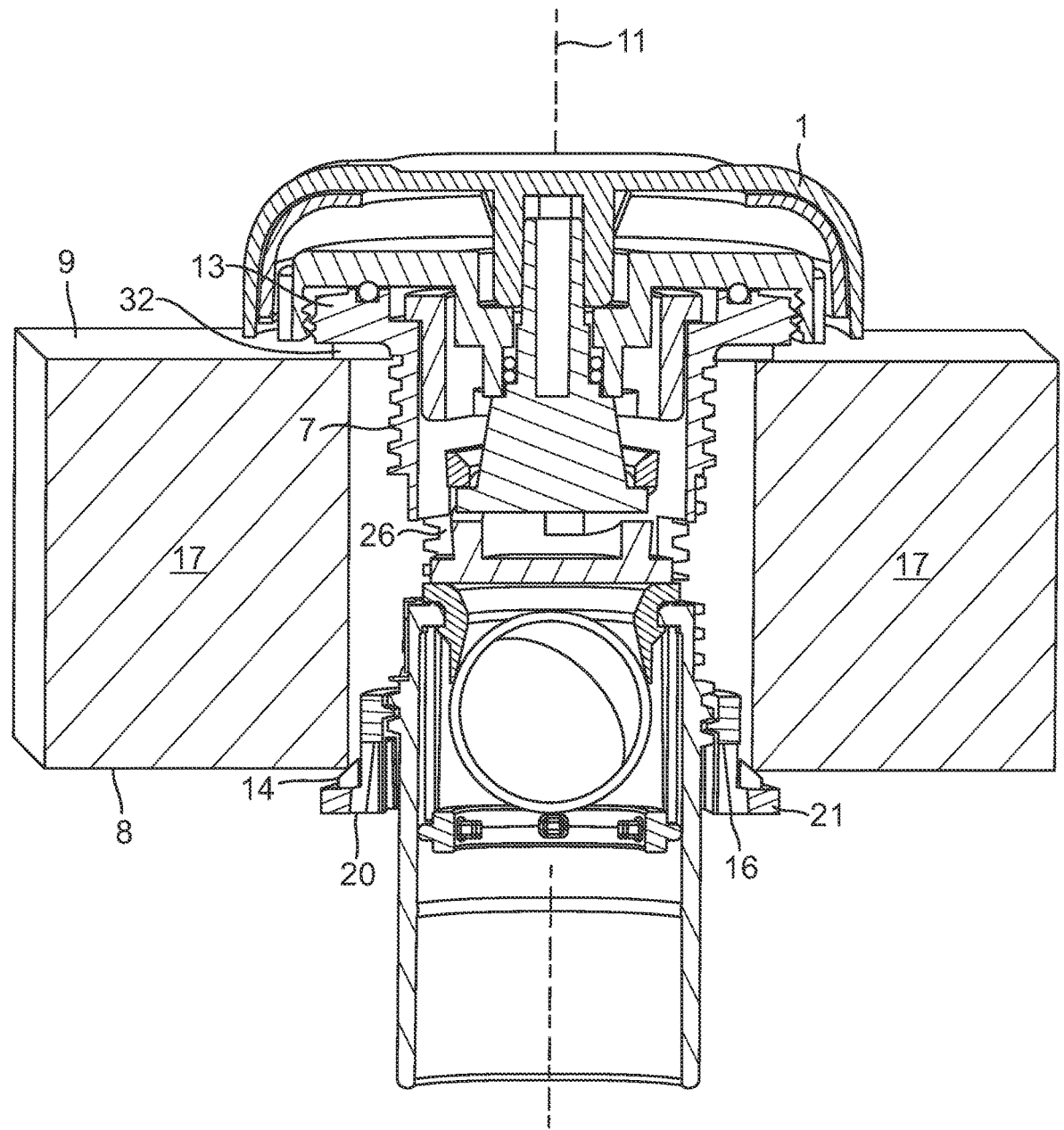
FIG. 9A is the same view as FIG. 8 with a thick spa wall also shown.
Figure 9B:
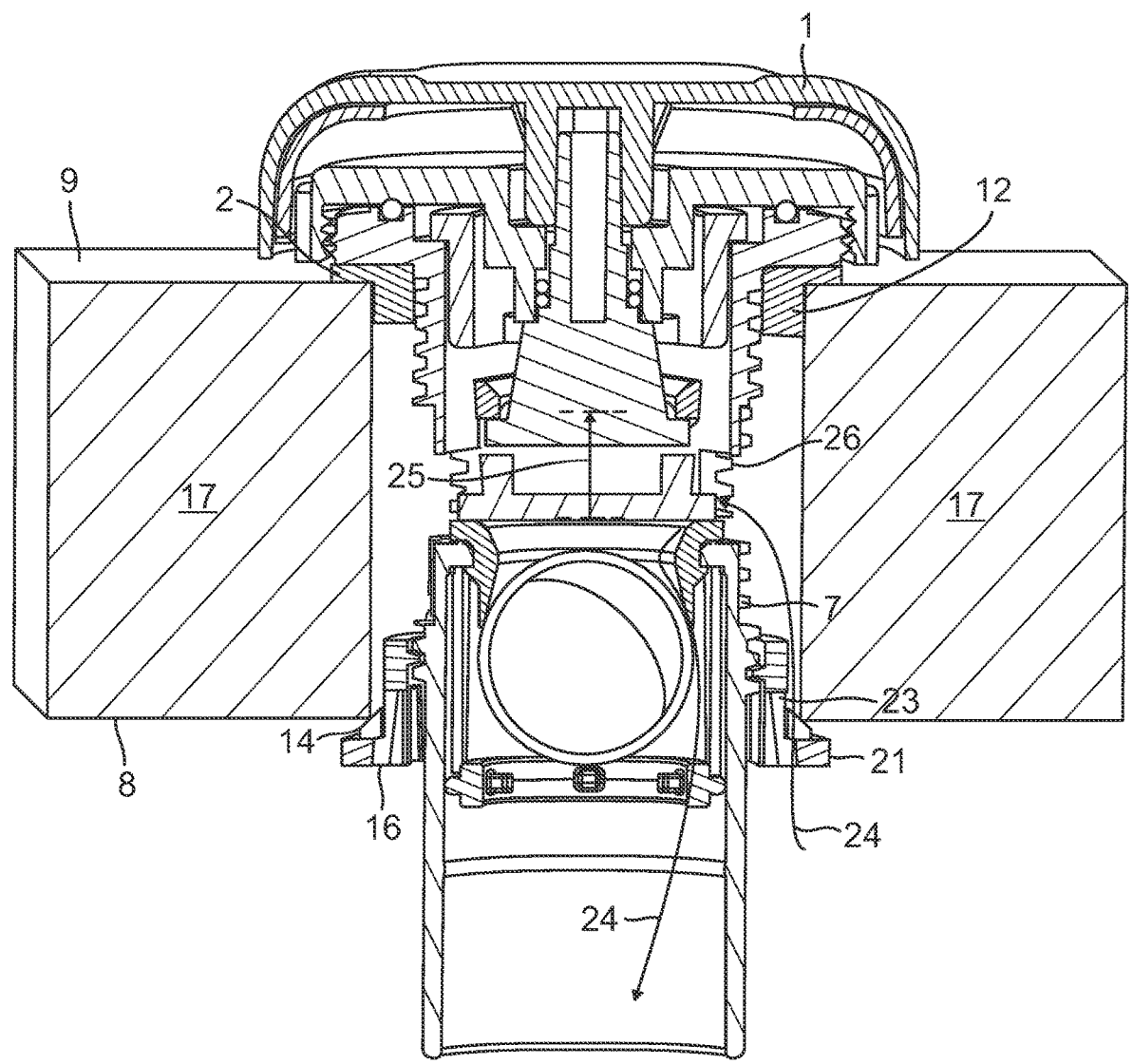
FIG. 9B is the same view as FIG. 9A showing the how the air flows through the compensation right/load washer of the alternate embodiment.

FIGS. 8-9B show how a fitting 1 unattached as well as attached to a thicker spa wall 17 and how the air flow 24 is compensated for using this alternate embodiment washer/nut 16, 21 assembly. FIG. 9A is an example of an assembly without a centering feature on the front side 9 of the spa wall 17. FIG. 9B has an arrow 25 indicating how the internal mechanism of air control valve, which is shown in the closed position, moves in the direction of the arrow 25 to open the air flow path through the air control.

The load washer 4 works best when its height is equal or greater than three threads 7 as found on the spa fitting 1 of choice, which provides for enhanced support. The major diameter of the threads 7 support and align the inner diameter of the load washer 4 to help maintain the central axis 11 of the load washer 4 in line with the central axis 11 of the fitting 1 to maintain even compression or force between the sealing surfaces of back of the fitting flange 13 and front side of spa wall 9 as the threads of the nut 5 pull against the fitting threads 7 to force the fitting flange 13 against the front side of the spa wall 9 as the nut 5 is supported by the compensation ring 4 and the conical outer perimeter boundary/frustoconical portion of the compensation ring 4 is supported by the thickest portion of the spa wall 3 at the back side 8 corner of the hole 6. Alternately, the load washer 14 works best when the outer diameter of the cylindrical body of the nut 18 supports and aligns the inner diameter of the load washer 14 to help maintain the central axis 11 of the load washer 14 in line with the central axis 11 of the fitting 1 to maintain even compression or force between the sealing surfaces of back of the fitting flange 13 and front side of spa wall 9 as the threads of the nut 16 pull against the fitting threads 7 to force the fitting flange 13 against the front side of the spa wall 9 as the nut 16 is supported by the compensation ring 14 and the conical outer boundary/frustoconical portion of the compensation ring 14 is supported by the thickest portion of the spa wall 3 at the back side 8 corner of the hole 6.

Figure 10:
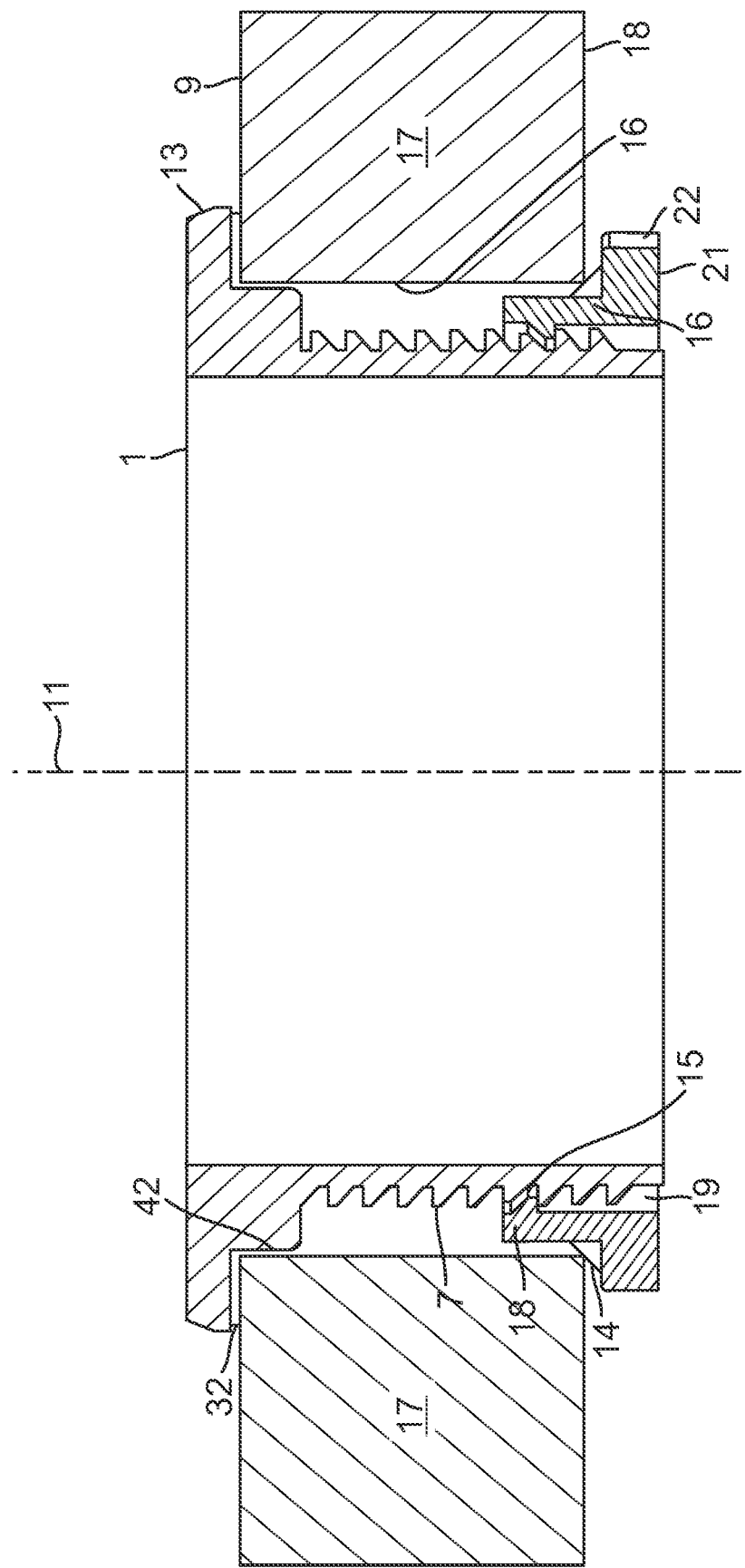
FIG. 10 is a side cross-sectional view of the version of the assembly employing the step, described below, but not shown in FIG. 6.

FIG. 10 is a side cross-sectional view of the version of the assembly employing the step described, but not shown in FIG. 6. In FIG. 10, the fitting 1 is customized with a step 42 below the flange 13 which is a centering feature of the assembly when there is an oversized hole 6. A sealing agent 32 is located below the flange 13 and outside of the step 42. The sealing agent 32 may be a flat gasket or a sealant, such as silicone sealant. This version of the assembly of FIG. 10 employing a thin sealing agent 32 may be preferable when a low-profile appearance of the assembly, as viewed from the water side 9 of the spa, is desired.

The assembly of FIG. 10 is employing the load washer 14 and nut 16, because the assembly is shown on a thick spa wall 17, though the fitting 1 with customized step 42 and sealing agent 32 of this embodiment illustrated in FIG. 10 could alternately be mounted to the wall 3 of FIG. 6 with the nut 5 and load washer 4 also of FIG. 6. Going back to FIG. 10, the hole 6 should have an inner diameter larger than the outer diameter of the customized step 42 of the fitting 1 and should have a central axis 11 that is perpendicular to the flat front face 9 of the spa wall 17 surrounding said hole 6. This alignment of the fitting 1 with customized step 42 within the hole 6 helps with proper positioning of the load washer 14 within the hole 6, which has the load washer 14 partially located within the hole 6 at the plumbing side 8 of the spa wall 17. At least a portion of the angle outer perimeter boundary of the load washer 14 contacts at least a portion of the back side 8 of the spa wall 17 when the nut 16 is installed and therefore results in a more secured parallel contact of the back side of fitting flange 13 and the front side 9 of the spa wall 17, while having the sealing agent 32 located therebetween said flange 13 and wall 17. The customized step 12 of fitting 1 and the sealing agent 32 may be omitted and the L-portion 12 of gasket 2 may be used in their place for centering and sealing the fitting 1 to the spa wall 17 (configuration not shown).

The air passage openings 23 can be omitted, filled in or removed for applications not requiring air passage around the nut 16 and load washer 14, such as water valves or hydrotherapy jets. The frustoconical feature of the load washer 4, 14 appears to be ideal, but other shapes might also be employed, such as spherical concave or convex ring segments contacting the backside wall corner of the hole 16. Ribs or segments, ideally equally spaced, such as 3 segments 120 degrees apart, are also envisioned. These segments may have similar shaping as the frustoconical, spherical concave or convex or other shaping. The space between said ribs or segments may function as an alternate form of air intake openings.

The 45 degree angle for the frustoconical load washer 4, 14 seems to be ideal, but other angles may prove beneficial in particular configurations.

The nut 5, 16 has been demonstrated to contact the back of the load washer 4, 14 on a plane that is parallel to the front side 9 of the spa wall 3, 17. It is noted that other forms of contact may have benefits, such as contacting on a frustoconical surface, of the same or different angle as the frustoconical contact surface of the load washer 4, 14 with the spa wall 3. This frustoconical contact surface of the nut 5, 16 acting on a mating frustoconical relief on the load washer 4, 14 would help to buttress the inward loading on load washer 4, 14 by the spa wall 3 when the assembly is under load from the torqued threaded engagement of the assembly. This new contact feature on the nut 5, 16 may be the only contact surface or it may be combined with original contact surface between the load washer 4, 14 and the nut 5, 16 that is parallel to the front side 9 of the spa wall 3. This combined contact, surface may prevent hoop stress, i.e., force applied outward from the central axis of the load washer, on the load washer 4, 14 as the load washer 4, 14 will be prevented from slipping on to a larger portion of the cone segment of the nut 5, 16, as in the way a jeweler uses a mandrel to stretch a ring's inner diameter larger.

Threads are one form of retention, but could be replaced by various alternate retention means, e.g., a nut wedged/swaged, spin welded, sonic welded to the fitting body 1 while the gasket 2 is in a compressed state for sealing purposes. The gasket 2 is the sealing component described, but in certain applications, the gasket 2 may be replaced with a sealant, such as silicone sealant or other means for sealing. In these alternate applications, maintaining the fitting flange 13 parallel with the front side 9 of the spa wall 3 is important. The load washer 4, 14 prevents the assembly from rocking which can break the seal of the sealant. Rocking can occur during shipping of the assembled vessel. Vibrations and jarring movements can cause components to move. In operation, surging of water in plumbing, especially during the startup of the pump, can move plumbing that acts like a lever on the fitting assembly. It is envisioned that the nut of the of the alternate retention means may look and function similar to the nut 14 wherein there are no threads on the inner diameter of the nut 14 nor on the fitting 1 and the fitting 1 would have a smooth diameter approximately that of the major diameter of the threads that have been removed and the inner diameter of the nut 19 is sized with an appropriate fit or interference fit for the various wedged/swaged, spin welded, or sonic welded attachment means and the nut of the alternate retention means would support the load washer in a similar that load washer 14 is described as being supported by nut 16. The load washer 4, 14 of various attachment means may benefit from low friction and or high lubricity materials to reduce friction with the nut 5, 16 as it, preferred that the nut 5, 16 may rotated, vibrated or otherwise moved without restriction or resistance from the load washer 4, 14. It may be preferable in some instances to further relieve friction or alternately maintain tension by employing additional commonly known washers between the load washer 4, 14 and the nut 5, 16.

The instant invention also contemplates the inclusion of lighting to any embodiment. Lighting could be added to attachments on either the spa fitting or the nut used in either embodiment. This feature is not shown in the figures. In essence, four cylindrical tubes that are parallel with the central axis of the nut allows LEDs to be added to the assembly. Any combination of the load washer, gasket, sealing agent, fitting, and or nut can be light transmissive, transparent, or translucent to allow for lighting to be viewed through some aspect of the fitting assembly from the front side of the spa.

For instance, the nut could be opaque with through holes in each of the LED light tubes on the nut to allow light to pass to a translucent load washer that scatters the light and passes the light to the fitting for propagation to the front side of the spa. In this example, the gasket could be transparent, translucent or opaque, depending on where the final lighting effect is permitted to be viewed from the front side of the spa wall. For instance, if an opaque escutcheon surrounds and covers the fitting flange and gasket, the gasket can be any of opaque, transparent, or translucent. If an escutcheon is in the same position as the previous example but is transparent, translucent, or opaque with window openings for viewing the light, the lighting effect may benefit from the gasket being transparent or translucent and not opaque, as an opaque gasket would tend to block or obscure the lighting effect.

If some other means, other than direct light propagation/transmission is used, such as indirect lighting using light, pipes or some similar light transmission concept similar to fiberoptics filaments, to internally reflect light within any of the fitting, escutcheon, and or other fitting assembly component, being transparent and transmitting light internal to the component structure to propagate the light around the gasket and not directly in the line of sight from the said light source through the gasket and viewable from the escutcheon, the gasket may be opaque and the final lighting effect may benefit from the blocking of the direct light, such as a finely etched lighting detail on the escutcheon that allows the light to escape from the internal light reflection within the escutcheon, so that the finely etched lighting detail is not washed out or overpowered by the direct light as the opaque gasket and or other opaque components in direct light path from the light source blocks direct light transmission to the final finely etched lighting detail lighting effect. The frustoconical shape of a transparent load washer may be used to redirect light from the light source from the light travelling inline with the central axis to travelling at differing angles than the central axis through refraction of the light against the outer perimeter angle of the load washer.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An assembly for sealing of fittings to spa walls comprising:
   a spa wall further comprising:
      a back/plumbing side and
      a front/water side;
   a hole in said spa wall for the placement therewithin of a fitting, said fitting further comprising:
      a flange;
      a cylindrical body; and
      threads around said cylindrical body;
   a sealing agent placed between said front/water side of said spa wall and said flange of said fitting, wherein at least the outer perimeter of said sealing agent being larger in diameter than said hole;
   a compensation ring/load washer further comprising:
      a top side;
      a bottom side; and
      a center aperture, said center aperture further comprising:
         an outer perimeter defining a boundary of said compensation ring/load washer that is positioned opposite from an inner aperture boundary of said compensation ring/load washer, said compensation ring/load washer having a conical profile; and
   a nut affixable to said compensation ring/load washer around said fitting to the back side of said spa wall wherein said conical profile fits partially into said spa wall hole and maintains a substantially parallel back side of said compensation ring/load washer to said front/water side of said spa wall wherein a center axis extends through said fitting through to said nut in a direction perpendicular to the front side of said spa wall.

2. The assembly as defined in claim 1 wherein said sealing agent is a gasket.

3. The assembly as defined in claim 1 wherein said sealing agent is a sealant.

4. The assembly as defined in claim 1, wherein said compensation ring/load washer further comprises one or more tabs extending outwardly from said central axis beyond an outer diameter of said nut.

5. The assembly as defined in claim 2 wherein said gasket includes an L-portion that centers said fitting inside of said hole.

6. The assembly as defined in claim 1 wherein said compensation ring/load washer has an inner diameter that is greater than a diameter said threads on said fitting.

7. The assembly as defined in claim 1 wherein said nut further comprises threads that are positioned forward of the back side of said compensation ring/load washer and a cylindrical body of said nut wherein said threads are within an inner diameter of said nut and adjacent a front side of said nut for coupling with adjacent threads on said fitting and wherein a back side of said cylindrical body of said nut has a flange extending outward from said central axis.

8. The assembly as defined in claim 6 wherein said nut further comprises a flange with gripping portions.

9. The assembly as defined in claim 7 wherein said fitting has air bypass openings, said air bypass openings being incorporated into said nut.

10. The assembly as defined in claim 9 wherein said air bypass openings are fitted within said hole in said spa wall.

11. The assembly as defined in claim 1 wherein said fitting has air bypass openings, said air bypass openings being incorporated into said load washer.

12. The assembly as defined in claim 1 wherein said fitting further comprises a step below said flange that centers said fitting inside of said hole.

13. An assembly for sealing of fittings to spa walls comprising:
   a fitting, said fitting further comprising:
      a flange;
      a cylindrical body; and
      threads around said cylindrical body;
   a sealing agent placed between said flange of said fitting and a front side of a spa wall;
   a compensation ring/load washer, said compensation ring further comprising:
      a top side
      a bottom side;
      and a center aperture, said center aperture further comprising an outer perimeter opposite an inner aperture boundary and having a conical profile; and
   a nut that is affixable to said compensation ring/load washer around said fitting and to said spa wall wherein said conical profile fits partially into a hole in said spa wall thereby creating a near parallel surface of said fitting flange to said spa wall.

14. The assembly as defined in claim 13 wherein said sealing agent is a gasket.

15. The assembly as defined in claim 13 herein said sealing agent is a sealant.

16. The assembly as defined in claim 13 wherein said compensation ring/load washer further comprises one or more tabs extending outwardly from said nut.

17. The assembly as defined in claim 14 wherein said gasket further comprises an L-portion to center said fitting inside of said hole.

18. The assembly as defined in claim 13 wherein said compensation ring/load washer has an inner diameter that is greater than a diameter of said threads on said fitting.

19. The assembly as defined in claim 13 wherein said fitting further comprises a step below said flange.

20. The assembly as defined in claim 13 wherein said nut further comprises threads that are positioned forward of the back side of said compensation ring/load washer and a cylindrical body with said threads within an inner diameter and adjacent a front side of said nut for coupling with adjacent threads on said fitting and wherein a back side of said cylindrical body of said nut has a flange extending outward from said central axis.

* * * * *